(12) United States Patent
Uemura

(10) Patent No.: US 8,639,052 B2
(45) Date of Patent: Jan. 28, 2014

(54) IMAGE PROJECTION APPARATUS, CONTROL METHOD, AND PROGRAM

(75) Inventor: Shinichi Uemura, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 122 days.

(21) Appl. No.: 13/311,007

(22) Filed: Dec. 5, 2011

(65) Prior Publication Data
US 2012/0148172 A1 Jun. 14, 2012

(30) Foreign Application Priority Data

Dec. 14, 2010 (JP) ................................. 2010-278563

(51) Int. Cl.
*G06K 9/40* (2006.01)
*G06K 15/10* (2006.01)

(52) U.S. Cl.
USPC ............ 382/264; 382/254; 382/275; 358/1.2

(58) Field of Classification Search
USPC ......... 382/254, 263–264, 266, 269, 274, 275, 382/298–300, 312; 358/1.2, 3.26, 3.27, 358/528, 532, 533; 345/611, 670
See application file for complete search history.

(56) References Cited

U.S. PATENT DOCUMENTS

| | | | | |
|---|---|---|---|---|
| 5,138,672 A * | 8/1992 | Hirabayashi et al. | ......... | 382/264 |
| 5,374,995 A * | 12/1994 | Loveridge et al. | ............ | 358/447 |
| 5,459,528 A * | 10/1995 | Pettitt | ............................ | 348/568 |
| 6,724,398 B2 * | 4/2004 | Someya et al. | ............... | 345/690 |
| 7,260,266 B2 * | 8/2007 | Nakajima et al. | ............. | 382/240 |
| 7,477,802 B2 * | 1/2009 | Milanfar et al. | ............. | 382/299 |
| 7,991,364 B2 * | 8/2011 | Rousu et al. | .................... | 455/78 |
| 8,108,211 B2 * | 1/2012 | Baqai et al. | .................. | 704/226 |
| 8,320,703 B2 * | 11/2012 | Mizuno | .......................... | 382/275 |
| 8,326,050 B2 * | 12/2012 | Au et al. | ....................... | 382/232 |

FOREIGN PATENT DOCUMENTS

JP 2005-210418 A 8/2005

* cited by examiner

*Primary Examiner* — Kanjibhai Patel
(74) *Attorney, Agent, or Firm* — Canon USA, Inc., IP Division

(57) ABSTRACT

An image projection apparatus includes a calculation unit, a band limiting unit, a reduction processing unit, and an edge enhancement unit. The calculation unit calculates a reduction ratio of an input image. The band limiting unit applies a low-pass filter to the input image. The reduction processing unit produces a reduced image by performing reduction processing with respect to the input image which has undergone an application of the low-pass filter by the band limiting unit using the reduction ratio calculated by the calculation unit. The edge enhancement unit sets a frequency characteristic of a bandpass filter based on a cutoff frequency used by the band limiting unit to apply a low-pass filter to the input image, and performs, using the frequency characteristic, edge enhancement processing with respect to the image reduced by the reduction processing unit.

13 Claims, 8 Drawing Sheets

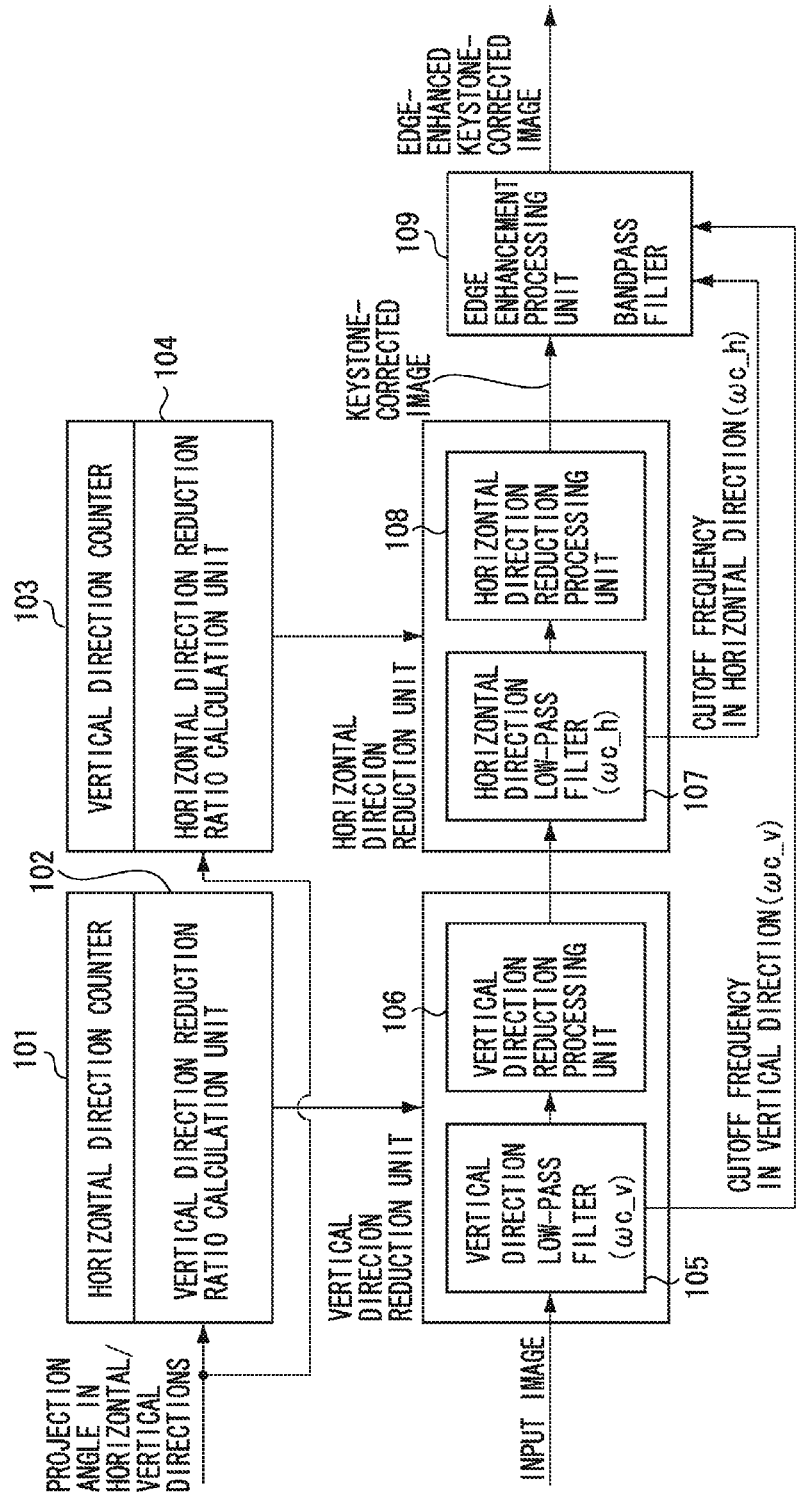

INPUT IMAGE

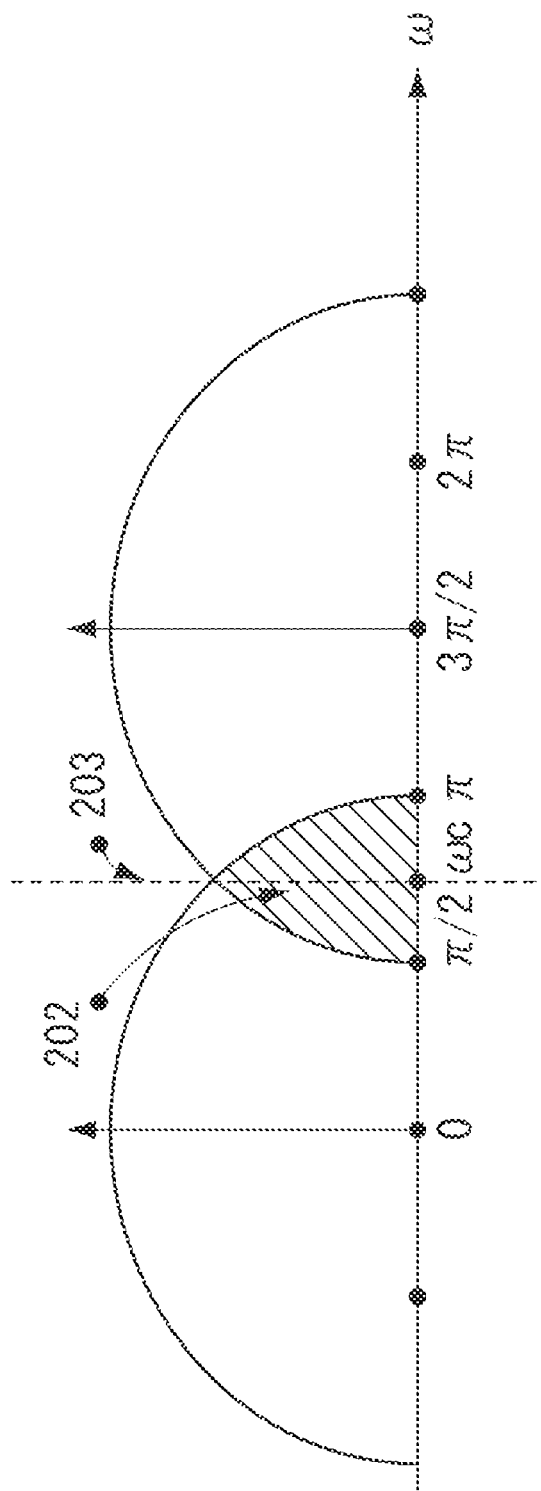

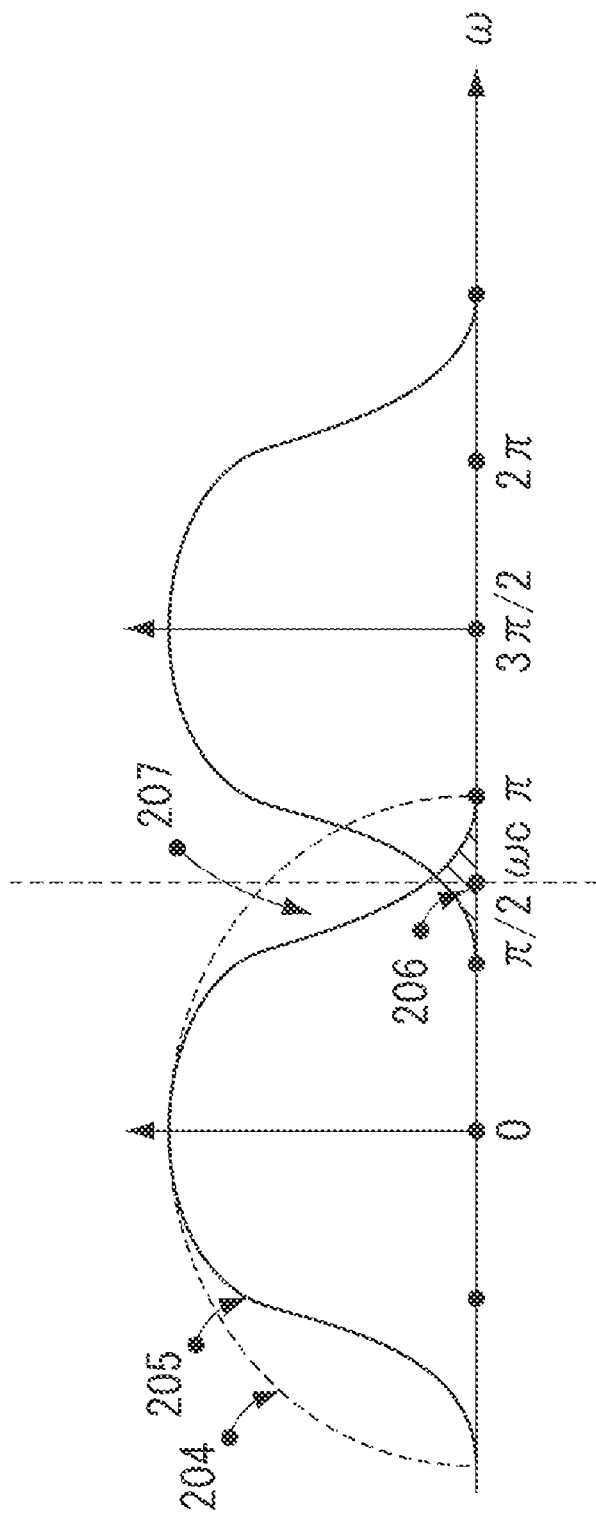

IMAGE PROJECTION APPARATUS, CONTROL METHOD, AND PROGRAM

BACKGROUND OF THE INVENTION

1. Field of the Invention

The present invention relates to an image projection apparatus configured to project an image in such a manner that trapezoidal distortion of the projected image is corrected, and a control method and a program thereof.

2. Description of the Related Art

When an image is projected on a screen by an image projection apparatus such as a projector, trapezoidal distortion of the image occurs depending on the projection angle. A keystone correction is performed to an input image to correct the distortion so that the input image and the projection image become geometrically similar. If the keystone correction is performed by reducing the input image, band limitation is performed by a low-pass filter before the reduction processing to suppress a moire pattern. The moire pattern is recognized when aliasing distortion occurs.

However, when the band limitation is performed, frequency domain that does not require limitation is also limited. As a result, a problem of a blurred projection image occurs. In response, Japanese Patent Application Laid-Open No. 2005-210418 discusses performing edge enhancement processing to the image obtained after the keystone correction to reduce the blurring of the image.

However, when the edge enhancement processing is performed, if the processing includes processes that enhance a frequency which is higher than a predetermined level, for example, edge extraction using a high-pass filter, the frequency band which has been limited to avoid aliasing is also enhanced. As a result, a moire is formed and further, the moire is enhanced to be projected.

SUMMARY OF THE INVENTION

The present invention is directed to displaying a moire suppressed image while edge enhancement is performed.

According to an aspect of the present invention, an image projection apparatus includes a calculation unit, a band limiting unit, a reduction processing unit, and an edge enhancement unit. The calculation unit calculates a reduction ratio of an input image. The band limiting unit applies a low-pass filter to the input image. The reduction processing unit produces a reduced image by performing reduction processing with respect to the input image which has undergone an application of the low-pass filter by the band limiting unit using the reduction ratio calculated by the calculation unit. The edge enhancement unit sets a frequency characteristic of a bandpass filter based on a cutoff frequency used by the band limiting unit to apply a low-pass filter to the input image, and performs, using the frequency characteristic, edge enhancement processing with respect to the image reduced by the reduction processing unit.

According to the present invention, the cutoff frequency of the bandpass filter is changed according to the cutoff frequency of the low-pass filter, so that a moire-suppressed image can be displayed while edge-enhancement is being performed.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram according to a first exemplary embodiment.

FIGS. 2A to 2E are frequency spectrum drawings illustrating an outline of processing according to the first exemplary embodiment.

DESCRIPTION OF THE EMBODIMENTS

Figure 2A:
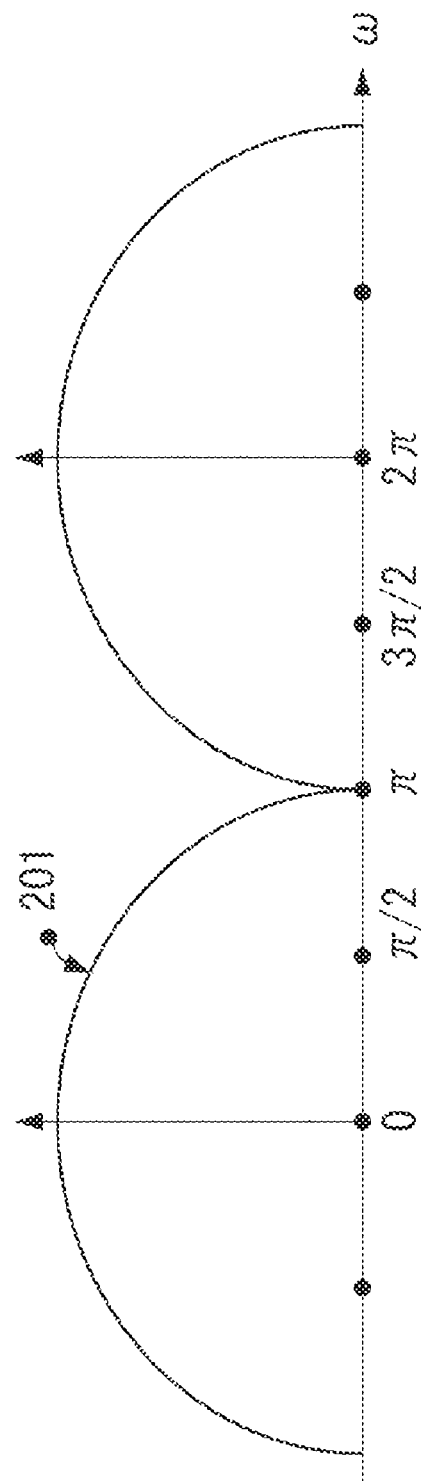

Various exemplary embodiments, features, and aspects of the invention will be described in detail below with reference to the drawings.

FIG. 1 is a block diagram illustrating a configuration according to a present exemplary embodiment. The configuration includes a horizontal direction counter 101, a vertical direction reduction ratio calculation unit 102, a vertical direction counter 103, and a horizontal direction reduction ratio calculation unit 104. The configuration also includes a vertical direction reduction unit, a horizontal direction reduction unit, and an edge enhancement processing unit 109. The vertical direction reduction unit includes a vertical direction low-pass filter 105 and a vertical direction reduction processing unit 106. The horizontal direction reduction unit includes a horizontal direction low-pass filter 107 and a horizontal direction reduction processing unit 108. The edge enhancement processing unit 109 includes a bandpass filter.

The vertical direction reduction ratio calculation unit 102 calculates a reduction ratio of each pixel of the input image in the vertical direction based on the projection angle of the image projection apparatus input by an external device and based on the horizontal direction position information of the input image calculated by the horizontal direction counter 101.

The vertical direction low-pass filter 105 determines, by the calculated vertical direction reduction ratio, an optimum cutoff frequency ($\omega c\_v$) useful in suppressing aliasing, and a factor of the low-pass filter that realizes the optimum cutoff frequency. Then, the vertical direction low-pass filter 105 performs band limitation in the vertical direction on the input image. The vertical direction reduction processing unit 106 performs the reduction processing in the vertical direction on the image which has undergone the band limitation processing.

The horizontal direction reduction ratio calculation unit 104 calculates a reduction ratio of each pixel of the input image in the horizontal direction based on the projection angle of the image projection apparatus input by an external device and based on the vertical direction position information of the input image calculated by the vertical direction counter 103.

The horizontal direction low-pass filter 107 determines, by the calculated vertical direction reduction ratio, an optimum cutoff frequency ($\omega c\_h$) useful in suppressing aliasing, and a factor of the low-pass filter that realizes the optimum cutoff frequency. Then, the horizontal direction low-pass filter 107 performs band limitation in the horizontal direction on the input image. The horizontal direction reduction processing unit 108 performs the reduction processing in the horizontal direction on the image which has undergone the band limitation processing and generates a keystone-corrected image.

As described above, before the reduction processing is performed, the band limitation is executed by the low-pass filter with a cutoff frequency corresponding to the reduction ratio, so that the aliasing (moire) that occurs when the image is reduced can be suppressed. However, since the low-pass filter can be realized in the circuit is not ideal, the frequency domain that should not be limited is also attenuated and, as a result, an image blurs. This will be described with reference to FIGS. 2A to 2E.

A curve 201 in FIG. 2A represents a frequency spectrum of one line in the horizontal direction of the input image. The sampling frequency is Nyquist frequency (one-half times the frequency of the input image). Thus, the frequency spectrum repeatedly appears in a cycle period of $2\pi$ and the aliasing does not occur. A frequency spectrum of an image obtained by reducing the input image by ¾ in the horizontal direction is illustrated in FIG. 2B. Since the sampling frequency is reduced according to the reduction, as illustrated in FIG. 2B, the frequency spectrum is repeated with a cycle of $3/2\pi$ ($2\pi \times$ ¾).

Thus, as illustrated in an area 202, an overlapping (aliasing) is generated in the frequency spectrum, and a moire pattern is displayed on the projection screen. To avoid this aliasing, a low-pass filter with a cutoff frequency 203 ($\omega c$) is designed to cut off frequencies higher than the cutoff frequency $\omega c$ and pass only low frequencies. However, if a finite impulse response (FIR) filter, whose impulse response is finite, is used, the above-described ideal low-pass filter is not designed. Thus, some frequencies higher than the cutoff frequency $\omega c$ cannot be cut off and some frequencies lower than the cutoff frequency $\omega c$ are cut off. This is illustrated in FIG. 2C.

In FIG. 2C, a frequency spectrum 204 of the input image and a frequency spectrum 205 after the input image has undergone the processing of the low-pass filter with a cutoff frequency of $\omega c$ are shown. As can be seen from an area 206, the frequencies higher than the cutoff frequency $\omega c$ are cut off, so that the overlapping area of the frequency spectrum is reduced. Thus, the occurrence of the moire is suppressed. However, as can be seen from an area 207, since the frequencies that ideally should not be cut off are cut off, a problem of a blurred image occurs. For this problem, blur can be improved by performing the edge enhancement.

However, if the edge enhancement is performed without considering the cutoff frequency $\omega c$ of the low-pass filter, a frequency domain higher than the cutoff frequency $\omega c$ will be enhanced and, as a result, a problem that a moire will be generated or the moire is enhanced occurs. This is illustrated in FIG. 2D.

Figure 2D:
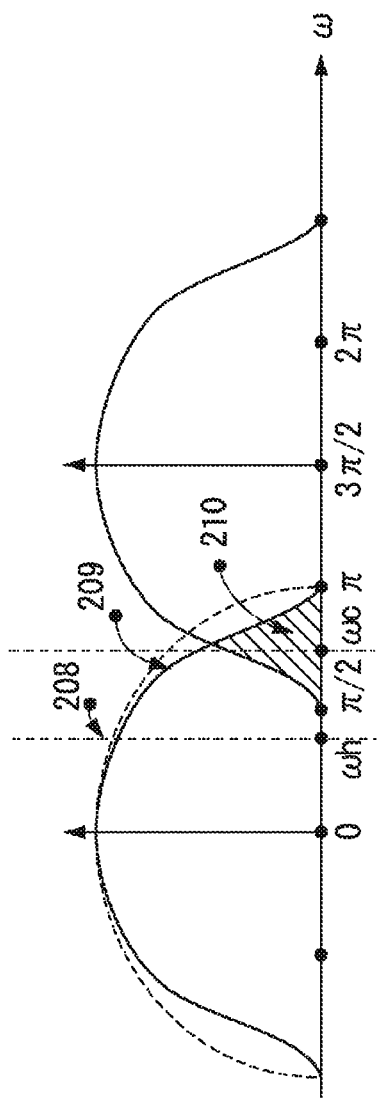

The frequency spectrum in FIG. 2D illustrate the frequency spectrum in which high frequency portion is enhanced by a high-pass filter, as compared with the frequency spectrum illustrated in FIG. 2C. A dotted line 208 represents a frequency ($\omega h$) at which a high-frequency enhancement starts. The frequency-enhanced domain is from $\omega h$ to $\pi$. Thus, as indicated by 209, a frequency domain which has been attenuated by the low-pass filter is enhanced and the blurring of the projection image is improved. However, as an area 210 indicates, since the overlapping area of the frequency spectrum is increased, a problem, which is that a moire pattern generates or the moire is enhanced when the image is projected, occurs.

According to an embodiment, the edge enhancement is performed by a bandpass filter which can change the cutoff frequency on the high frequency side according to the cutoff frequency $\omega c$, so that the enhancement of the edge portion, which has been attenuated by the low-pass filter, can be realized while suppressing the moire. To realize this processing, the edge enhancement processing unit 109 illustrated in FIG. 1 extracts the edge of the image after the keystone correction by using a bandpass filter and performs the edge enhancement processing.

A cutoff frequency ($\omega c\_v$) of each pixel in the vertical direction is input by the vertical direction low-pass filter 105 in the edge enhancement processing unit 109. Further, a cutoff frequency ($\omega c\_h$) of each pixel in the horizontal direction is input by the horizontal direction low-pass filter 107 in the edge enhancement processing unit 109. The frequency characteristic and the filter factor of the bandpass filter are set to such values that the cutoff frequencies serve as the cutoff frequencies on the high frequency side of the bandpass filter.

The calculation method of the filter factor can be calculated in real time by the inputted cutoff frequency of the low-pass filter. Alternatively, desired filter factors are stored in a memory in advance, a filter factor can be selected and output from the memory according to the cutoff frequency.

Further, according to an embodiment, when the factor of the bandpass filter is determined, the configuration of the image processing apparatus is not necessarily limited to the configuration illustrated in FIG. 1. For example, the factor of the low-pass filter of each pixel of the keystone-corrected image can be determined from the counter values in the horizontal direction and in the vertical direction. Thus, the bandpass filter factor can be determined from the above-described counter values.

Figure 2E:
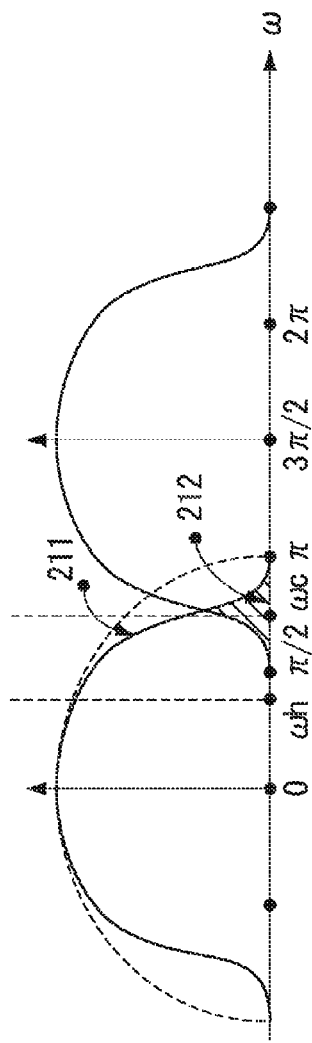

The effect of this filter is illustrated in FIG. 2E. According to the high frequency enhancement processing using the bandpass filter, the frequency domain from $\omega h$ (starting point) to $\omega c$ is enhanced. In this manner, as illustrated in 211, the frequency domain attenuated by the low-pass filter is enhanced, and further, as illustrated in 212, the overlapping area of the frequency spectrum is reduced and the moire can be suppressed.

Figure 3:
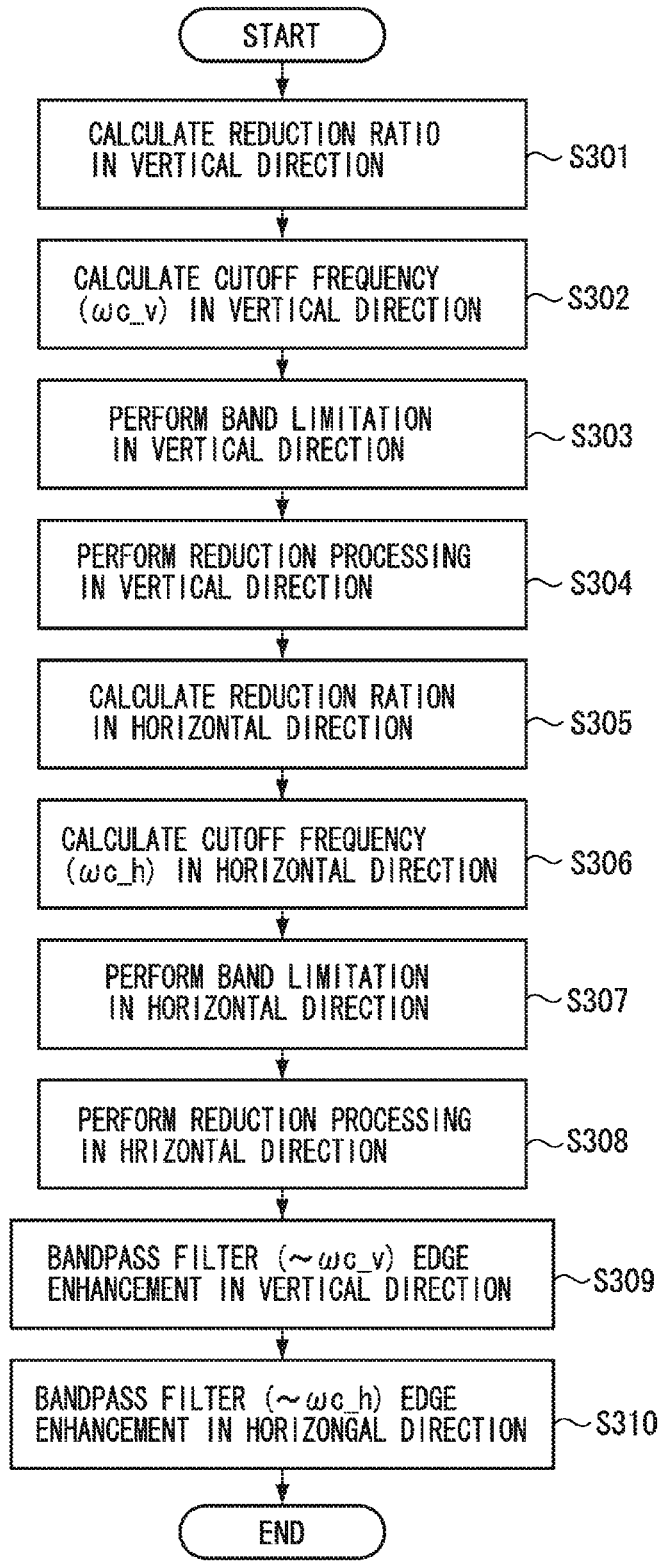
FIG. 3 is a flowchart illustrating flow of the image processing according to the first exemplary embodiment

The above-described processing procedures will be described with reference to the flowchart illustrated in FIG. 3. In step S301, the vertical direction reduction ratio calculation unit 102 calculates a reduction ratio of the image in the vertical direction from the projection angle of the image projection apparatus.

In step S302, the vertical direction low-pass filter 105 calculates the cutoff frequency ($\omega c\_v$) in the vertical direction from the reduction ratio. In step S303, the vertical direction low-pass filter 105 performs the band limitation of the input image in the vertical direction with the low-pass filter having the above-described cutoff frequency.

In step S304, the vertical direction reduction processing unit 106 performs the reduction processing in the vertical direction. In step S305, the horizontal direction reduction ratio calculation unit 104 calculates the reduction ratio in the horizontal direction from the projection angle of the image projection apparatus.

In step S306, the horizontal direction low-pass filter 107 calculates the cutoff frequency ($\omega c\_h$) in the horizontal direction from the reduction ratio. In step S307, the horizontal direction low-pass filter 107 performs the band limitation of the input image in the horizontal direction with the low-pass filter having the above-described cutoff frequency.

In step S308, the horizontal direction reduction processing unit 108 performs the reduction processing in the horizontal direction and generates a keystone-corrected image.

In step S309, the edge enhancement processing unit 109 sets the filter factor of the bandpass filter. The value of the filter factor is determined to such a value that the cutoff frequency ($\omega c\_v$) in the vertical direction of each pixel calculated in step S302 is the cutoff frequency of the higher frequency side. This filter factor can be calculated in real time according to the input cutoff frequency or selected from the filter factors, stored in advance in the memory, according to the cutoff frequency. By using this bandpass filter, the edge enhancement processing unit 109 extracts the edge component in the vertical direction, and performs the edge enhancement in the vertical direction.

In step S310, the edge enhancement processing unit 109 sets the filter factor of the bandpass filter. The value of the filter factor is determined to such a value that the cutoff frequency ($\omega c\_h$) in the horizontal direction of each pixel calculated in step S306 is the cutoff frequency of the higher frequency side. As is the case with the filter factor in the vertical direction, this filter factor can be calculated in real time according to the input cutoff frequency or selected from the filter factors stored in the memory. By using this bandpass filter, the edge enhancement processing unit 109 extracts the edge component in the horizontal direction, performs the edge enhancement in the horizontal direction, and generates an edge-enhanced keystone-corrected image.

According to an embodiment, the cutoff frequency of the bandpass filter is changed according to the cutoff frequency of the low-pass filter with respect to the image after the keystone correction, so that a moire-suppressed image can be displayed while edge-enhancement is being performed.

According to the above-described exemplary embodiment, each processing unit illustrated in FIG. 1 is realized by a hardware component. However, the processing performed by each processing unit illustrated in FIG. 1 can be performed by a computer-executable program.

Figure 4:
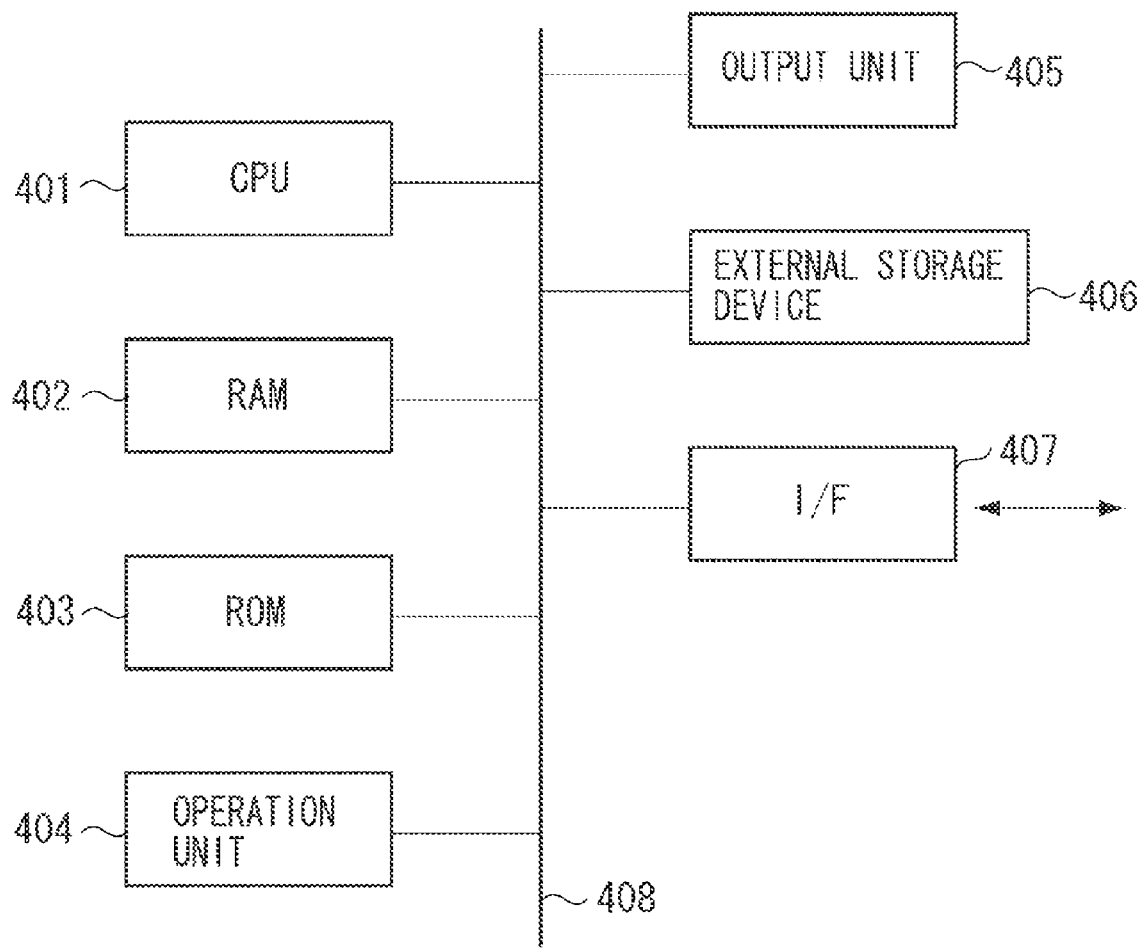
FIG. 4 is a block diagram illustrating a hardware configuration of a computer applicable to the image projection apparatus according to the present invention.

FIG. 4 is a block diagram illustrating an example of a hardware configuration of a computer which can be used for the image display apparatus according to the above-described exemplary embodiment.

A central processing unit (CPU) 401 controls the entire computer according to a computer program or data stored in a random access memory (RAM) 402 or a read-only memory (ROM) 403. Further the CPU 401 executes the above-described processing performed by the image processing apparatus according to the above-described each exemplary embodiment. In other words, the CPU 401 functions as each of the processing units illustrated in FIG. 1.

The RAM 402 includes an area used for temporarily storing a computer program or data loaded from an external storage device 406 or data acquired externally via an interface (I/F) 409. Further, the RAM 402 includes a work area which is used when the CPU 401 executes various types of processing. In other words, the RAM 402 can be assigned as a frame memory or arbitrarily provide other various areas.

Setting data of the computer and programs such as a boot program are stored in the ROM 403. An operation unit 404 includes a keyboard or a mouse. By the user of the computer operating the operation unit 404, various instructions are input into the CPU 401. A display unit 405 displays the result of the processing executed by the CPU 401. The display unit 405 includes, for example, a hold type display device such as a liquid crystal display device or an impulse type display device such as a field emission display device.

The external storage device 406 is a large capacity information storage unit represented by a hard disk drive apparatus. An operating system (OS) and a computer program, which is used when the CPU 401 realizes the function of each unit illustrated in FIG. 1, is stored in the external storage device 406. Further, each image data as a processing object can be stored in the external storage device 406.

The computer program or data stored in the external storage device 406 is loaded into the RAM 402 as appropriate according to the control of the CPU 401 and processed by the CPU 401. A network such as a local area network (LAN) or the Internet and other apparatus such as a projection apparatus or a display device can be connected to an I/F 407, so that the computer can receive and transmit various information via the I/F 407. A bus 408 connects each of the above-described units.

The operation realized by the above-described configuration is performed mainly by the CPU 401. The processing described with reference to the flowchart described above is controlled by the CPU 401.

The present invention can be achieved when a storage medium recording a code of a computer program that realizes the above-described function is supplied to the system and the system reads out and executes the code of the computer program. In this case, the program code read out from the storage medium itself realizes the function of the above-described exemplary embodiment, and the storage medium which stores the program code constitutes the present invention. Further, a case where an OS or the like, which runs on a computer, executes a part or whole of the actual processing based on an instruction of the program code so that a function of the above-described function is realized is also included in the present invention.

Furthermore, the present invention can be achieved following configuration. Specifically, the computer program code read out from the storage medium is written in a memory provided in a function expanding card inserted in a computer or a function expanding unit connected to the computer, and a CPU provided in the function expanding card or the function expanding unit performs the whole or a part of the actual processing based on an instruction from the computer program code to realize the functions of the above-described exemplary embodiment. The above-described configuration is also included in the present invention.

If the present invention is applied to the above-described storage medium, the code of the computer program corresponding to the flowchart described above will be stored in the storage medium. In an example, a computer-readable medium may store a program that causes an image projection apparatus to perform a method described herein. In another example, a central processing unit (CPU) may be configured to control at least one unit utilized in a method or apparatus described herein.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-278563 filed Dec. 14, 2010, which is hereby incorporated by reference herein in its entirety.

What is claimed is:
1. An image projection apparatus comprising:
 a calculation unit configured to calculate a reduction ratio of an input image based on a projection angle of the image projection apparatus;
 a band limiting unit configured to use a cutoff frequency to apply a low-pass filter to the input image;
 a reduction processing unit configured to produce a reduced image by performing reduction processing with respect to the input image which has undergone an application of the low-pass filter by the band limiting unit using the reduction ratio calculated by the calculation unit; and an edge enhancement unit configured to set a frequency characteristic of a bandpass filter based on the cutoff frequency used by the band limiting unit to apply a low-pass filter to the input image, and perform, using the frequency characteristic, edge enhancement processing with respect to the image reduced by the reduction processing unit, wherein trapezoidal distortion of a projection image, projected from the image projection apparatus, due to a projection angle of the image projection apparatus is reduced and the input image and the projection image become more geometrically similar.

2. The image projection apparatus according to claim 1, wherein the projection angle of the image projection apparatus is received from a device external to the image projection apparatus and the reduction ratio further is based on calculated horizontal direction position information of the input image.

3. The image projection apparatus according to claim 1, wherein the bandpass filter changes the cutoff frequency on a high frequency side according to the cutoff frequency used by the band limiting unit such that enhancement of an edge portion, which has been attenuated by the low-pass filter, can be realized while suppressing a moire.

4. The image projection apparatus according to claim 1, wherein the frequency characteristic and a filter factor of the bandpass filter are set to such values that the cutoff frequency serves as the cutoff frequency on a high frequency side of the bandpass filter.

5. The image projection apparatus according to claim 4, wherein the filter factor is calculated in real time by an inputted cutoff frequency of the low-pass filter or is retrieved from filter factors, previously stored in a memory, based on the inputted cutoff frequency.

6. The image projection apparatus according to claim 4, wherein the filter factor of the bandpass filter is based on a counter value in a horizontal direction.

7. A control method for an image projection apparatus, the control method comprising:
 calculating a reduction ratio of an input image based on a projection angle of the image projection apparatus;
 using a cutoff frequency to apply a low-pass filter to the input image;
 producing a reduced image by performing reduction processing with respect to the input image which has undergone an application of the low-pass filter using the calculated reduction ratio; and
 setting a frequency characteristic of a bandpass filter based on the cutoff frequency used to apply a low-pass filter to the input image, and perform, using the frequency characteristic, edge enhancement processing with respect to the reduced image,
 wherein trapezoidal distortion of a projection image, projected from the image projection apparatus, due to a projection angle of the image projection apparatus is reduced and the input image and the projection image become more geometrically similar.

8. The control method according to claim 7, wherein the projection angle of the image projection apparatus is received from a device external to the image projection apparatus and the reduction ratio further is based on calculated horizontal direction position information of the input image.

9. The control method according to claim 7, wherein the bandpass filter changes the cutoff frequency on a high frequency side according to the used cutoff frequency such that enhancement of an edge portion, which has been attenuated by the low-pass filter, can be realized while suppressing a moire.

10. The control method according to claim 7, wherein the frequency characteristic and a filter factor of the bandpass filter are set to such values that the cutoff frequency serves as the cutoff frequency on a high frequency side of the bandpass filter.

11. The control method according to claim 10, wherein the filter factor is calculated in real time by an inputted cutoff frequency of the low-pass filter or is retrieved from filter factors, previously stored in a memory, based on the inputted cutoff frequency.

12. The control method according to claim 10, wherein the filter factor of the bandpass filter is based on a counter value in a horizontal direction.

13. A non-transitory computer-readable storage medium storing a program that causes an image processing apparatus to perform a control method, the control method comprising:
 calculating a reduction ratio of an input image based on a projection angle of the image projection apparatus;
 using a cutoff frequency to apply a low-pass filter to the input image;
 producing a reduced image by performing reduction processing with respect to the input image which has undergone an application of the low-pass filter using the calculated reduction ratio; and
 setting a frequency characteristic of a bandpass filter based on the cutoff frequency used to apply a low-pass filter to the input image, and perform, using the frequency characteristic, edge enhancement processing with respect to the reduced image,
 wherein trapezoidal distortion of a projection image, projected from the image projection apparatus, due to a projection angle of the image projection apparatus is reduced and the input image and the projection image become more geometrically similar.

* * * * *